United States Patent [19]

Bremner

[11] Patent Number: 4,988,027

[45] Date of Patent: Jan. 29, 1991

[54] APPARATUS FOR CUTTING GLASS

[75] Inventor: Alan M. Bremner, Murrumbeena, Australia

[73] Assignee: Bremner Glass Equipment Pty. Ltd., Murrumbeena, Australia

[21] Appl. No.: 299,836

[22] PCT Filed: Jun. 3, 1988

[86] PCT No.: PCT/AU88/00173

§ 371 Date: Jan. 10, 1989

§ 102(e) Date: Jan. 10, 1989

[87] PCT Pub. No.: WO88/09775

PCT Pub. Date: Dec. 15, 1988

[30] Foreign Application Priority Data

Jun. 5, 1987 [AU] Australia ................ PI2320

[51] Int. Cl.⁵ ............................................. C03B 33/03
[52] U.S. Cl. ........................................ 225/2; 225/93; 225/96.5
[58] Field of Search ...................... 225/2, 96.5, 93

[56] References Cited

U.S. PATENT DOCUMENTS 2,111,393  3/1938  Gaskell .
3,465,934  9/1969  Ono et al. ............. 225/96.5
3,543,978  12/1970 Feillet .................... 225/2
3,668,955  6/1972  Rupprecht et al. ..... 225/96.5
4,471,895  9/1984  Lisec, Jr. ................ 225/2
4,747,329  5/1988  Lukens .................. 83/402

FOREIGN PATENT DOCUMENTS 1005694  4/1957  Fed. Rep. of Germany .
1696005  12/1971 Fed. Rep. of Germany .
1300659  12/1962 France .
2049963  3/1971  France .
2128983  5/1984  United Kingdom .

Primary Examiner—Hien H. Phan
Attorney, Agent, or Firm—Jeffers, Hoffman & Niewyk

[57] ABSTRACT

The invention deals with an apparatus and method for cutting laminated glass. The glass is delivered from a rack to a two-part table on which the glass is to be cut. The glass is partially cut and then flipped over by the movement of part of the table with the aid of means which may be a hydraulically operated ram. The other part of the table is fixed. The glass once flipped can be cut in a similar manner to the original uppermost sheet. The table may also be equipped with air flotation means which aids in the movement of the glass once on the table. The thin plastics layer sandwiched between the two sheets is cut in the usual manner for example, by applying heat thereto.

10 Claims, 1 Drawing Sheet

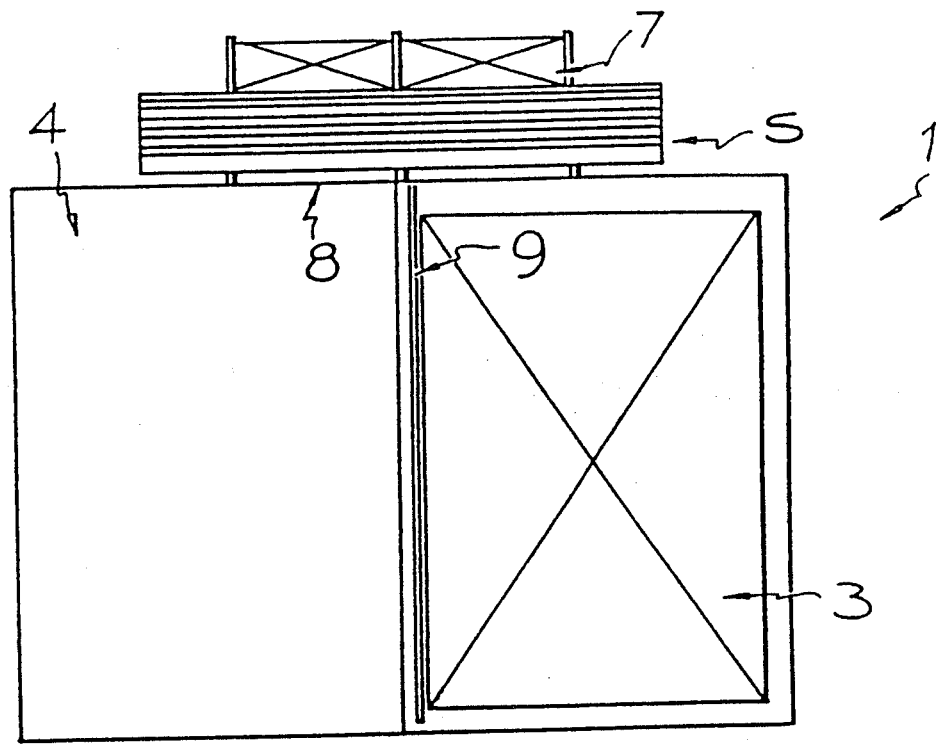
FIGURE.1
FIGURE.2
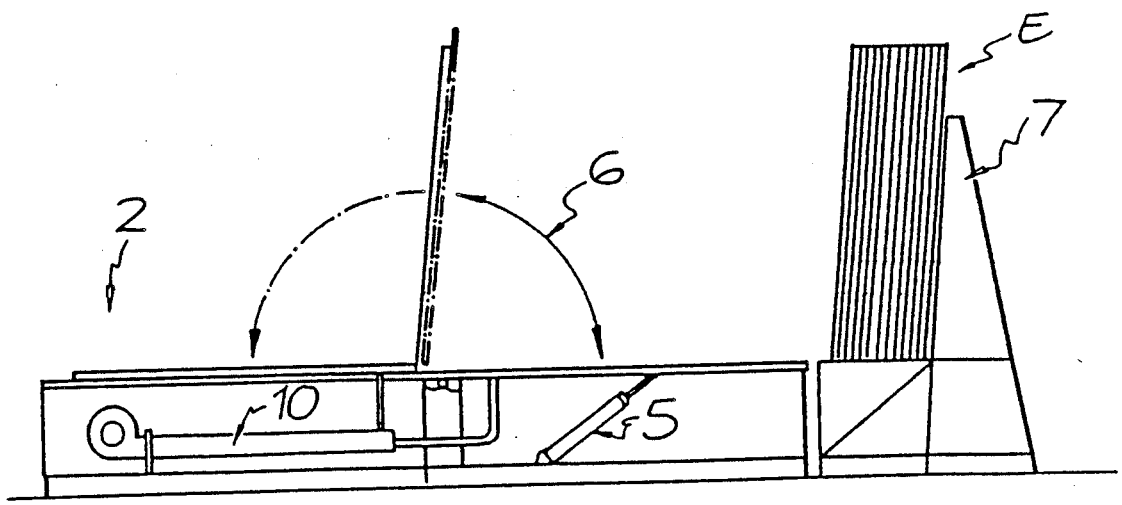

APPARATUS FOR CUTTING GLASS

The present invention is concerned with apparatus for cutting glass, and more particularly laminated glass. Laminated glass is generally characterized by two sheets of glass between which is sandwiched a thin layer of plastics material that serves amongst other things as a bonding medium.

The cutting of laminated glass entails the separate cutting of the two glass sheets. There are many ways of doing this, ranging from the use of relatively sophisticated (and hence expensive) machinery to relatively crude techniques which unfortunately suffer from being labour intensive. For instance, one item of machinery effects cutting of the two sheets on a table at the one time, one cutter arranged above the table and the other below. This machinery is very expensive and not without its problems; the lower cutting, for example, is only performed with considerable difficulty. At the crude end of the market so to speak, the laminated sheet is manually turned over or around and this, due to the overall weight of the sheet, can sometimes involve as many as four workmen to achieve that end.

It is the object of the present invention to provide apparatus for cutting laminated glass, which is simple and effective, of moderate cost and at the same time not labour intensive.

To this end, the invention according to one aspect makes provision for apparatus for cutting laminated glass comprising—
I. a two-part table on which the glass is to be cut;
II. a first part of the table being movable with respect to the second part, between a first position where it lies generally side by side with, or optionally in the same plane as the second part and a second position where it assumes an upright disposition with respect to the second part;
III. means for thus effecting movement of said first part between said first and second positions;
IV. means for delivering the glass to the table;
V. means for sequentially cutting the uppermost and lowermost sheets of the glass; and
VI. the arrangement being such that, after the uppermost sheet is cut, the first part of the table with the partially cut glass thereon is moved to said second position to facilitate delivery of the glass to the second part of the table from whence the lowermost sheet may be cut in the same or a similar manner to the uppermost sheet.

Another aspect of the invention provides for a method of cutting laminated glass comprising:
(i) delivering glass to a two-part table on which the glass is to be cut;
(ii) cutting the uppermost sheet of the glass;
(iii) flipping the glass over from one side to the other so that the lowermost sheet of the glass is presented for cutting in the same or a similar manner to the uppermost sheet; and
(iv) thus cutting the lowermost sheet of the glass;
wherein said flipping action is being performed by moving a first part of the table to an upright position with respect to a second part, thereby facilitating delivery of the glass to the second part in an inverted state.

In order that the invention may be more fully described and/or understood, reference is now made to a preferred embodiment as illustrated in the accompanying Figures.

FIG. 1—Plan view of the apparatus according to an embodiment of the invention.
FIG. 2—Front view of the apparatus according to an embodiment of the invention.

Referring now to both FIGS. 1 and 2, the apparatus—generally designated as 1—comprises a table 2 made up of two halves 3, 4. The half 3 is movable with respect to the half 4 under the influence of a hydraulically operated ram 5; see the arrow 6 for the general extent of movement of the half 3. The half 4 is fixed.

A rack 7 is arranged at one end adjacent the half 3 according to one system; or, in accord with another, along one side 8 of the table 2. The rack accommodates a number of precut to size pieces of laminated glass stacked in the manner best illustrated at position 'S' (the side position). Referring next, however, to the end position E, delivery of the first piece of glass to the table half 3 is achieved simply by tipping that piece beyond the vertical and allowing it to free fall on to the half 3. To this extent, then, the delivery means in this particular embodiment is a manual means; but, it need not necessarily be so. Air flotation means 10 may or may not be turned on while the glass free falls onto the half 3.

Once the glass piece has been thus delivered, the first cut in the uppermost sheet is made as required. Air flotation means 10, by the use of a manifold (not shown) to switch the air flow on the table, can create a vacuum thereon to hold the glass and aid in the cutting process. The glass is then moved to a position where the cut lies directly over a breaker bar 9, movement being facilitated with the aid of air flotation means 10 which in effect serve to lighten the weight of the glass. The first cut is then opened, the bar 9 raised to a limited extent with respect to the table 2 and pressure brought to bear on the glass to each side of the cut to complete this particular cutting step.

The next step involves rearranging the glass, if necessary, on the table half 3, whereupon that half is titled through 90° or thereabouts at which point the glass may with ease be caused to free fall on to the other table half 4.

At this position, the non-cut sheet of glass presents itself uppermost. The glass may subsequently be moved as desired on the table as a whole, again under the favourable influence of the flotation means 10. A second cut may then be performed on the uppermost sheet and this cutting exercise completed after the manner of the first.

All that remains thereafter is to cut the thin plastics layer sandwiched between the two sheets. This is done in conventional fashion—for instance, as by applying heat thereto. A heater bar may be attached to the end of the table for this purpose.

It is to be appreciated that variations and/or modifications may be made to the foregoing preferred embodiment without in any way departing from the overall spirit and scope of the invention.

I claim:
1. Method of cutting laminated glass comprising:
(i) delivering glass to a two-part table on which the glass is to be cut;
(ii) cutting the uppermost sheet of the glass;
(iii) flipping the glass over from one side to the other so that the lowermost sheet of the glass is presented for cutting in the same or a similar manner to the uppermost sheet; and
(iv) thus cutting the lowermost sheet of the glass;

wherein said flipping action is being performed by moving a first part of the table to an upright position with respect to a second part, thereby facilitating delivery of the glass to the second part in an inverted state.

2. The method of claim 1, wherein said delivery of the glass to the second part of the table in an inverted state is by free-falling the glass from the upright position.

3. The method of claim 1, wherein said cutting is performed by firstly scoring the glass by manually operable means, then completing the cut by placing the scored section over a breaker bar and applying a force thereto.

4. The method of claim 2, wherein said cutting is performed by firstly scoring the glass by manually operable means, then completing the cut by placing the scored section over a breaker bar and applying a force thereto.

5. An apparatus for cutting laminated glass having an uppermost sheet and lowermost sheet by the method of claim 1, comprising:
   a table on which a sheet of glass is to be cut, said table having a first generally planar part and a second generally planar part;
   said first part of said table being movable with respect to said second part between a first position where said first part lies generally side by side with said second part and a second position where said first part assumes an upright position with respect to said second part; and
   means for effecting movement of said first part between said first position and said second position;
   the arrangement being such that, after the uppermost sheet of glass is cut while on said first part of said table, said first part with the partially cut sheet of laminated glass thereon is moved to said second position to facilitate delivery of the glass to said second part of said table, at which time the original lowermost sheet is now exposed and may be cut in the same or a similar manner as the original uppermost sheet.

6. The apparatus of claim 5, wherein said first position of said first part of said table lies generally in the same plane as said second part of said table.

7. The apparatus of claim 5, wherein the arrangement is such that it allows the partially cut glass in said second position to free fall onto said second part of said table.

8. The apparatus of claim 5, wherein said first part of said table has a breaker bar attached thereto, for the purpose of completing the cutting and supporting the partially cut glass during movement.

9. The apparatus of claim 5, wherein said first and second parts of said table are in pivotal relation to one another.

10. The apparatus of claim 5, wherein said table is equipped with air flotation means which serves to lighten the weight of the glass and facilitate sliding movement of the glass on said table.

* * * * *